Feb. 24, 1959  E. JEREMIAH  2,874,856
APPARATUS FOR HANDLING CANS
Original Filed Nov. 24, 1953
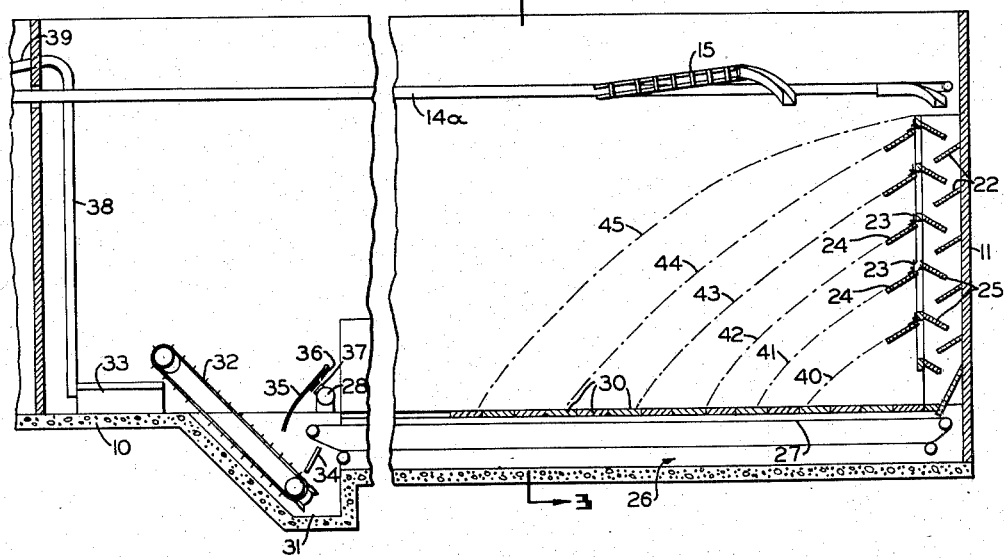
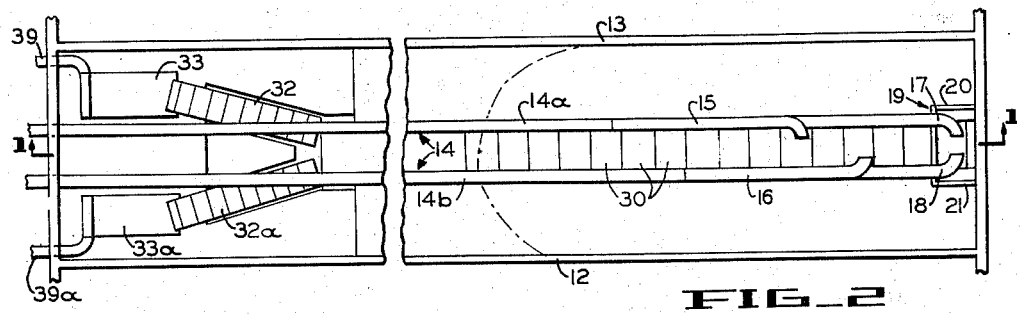
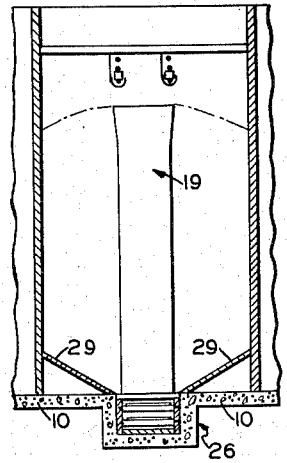
INVENTOR.
EARL JEREMIAH
BY
Meehan and Hanscom
ATTORNEYS

United States Patent Office 2,874,856
Patented Feb. 24, 1959

2,874,856

APPARATUS FOR HANDLING CANS

Earl Jeremiah, Hayward, Calif., assignor to United Can & Glass Company, Hayward, Calif., a corporation of Delaware Continuation of application Serial No. 394,183, November 24, 1953. This application August 13, 1956, Serial No. 603,758

4 Claims. (Cl. 214—16)

This invention relates to apparatus for handling cans, and is a continuation of my prior application, Serial No. 394,183, filed November 24, 1953, and now abandoned, this prior application being a companion application to my copending application filed November 24, 1953, entitled, "Can Unscrambler," and bearing Serial No. 394,053, now Patent No. 2,775,334. This present application is more specifically directed to an apparatus for the placing of empty cans in storage bins in random orientation after their manufacture and then removing the cans from storage so that they may be conveyed through a can unscrambler to can line conveyors of a cannery where they are to be filled.

Prior to the application of the instant apparatus, the cans from can making machines were conveyed to storage bins wherein they were then manually stacked in oriented position in the bin. When the cans were needed in the cannery, it was then necessary to remove the cans manually from the stack and place them on the can line conveyor. To perform these operations two people were required in each bin and they could only handle the unloading or loading of one conveyor; hence, the storage operation was very time-consuming and expensive.

I have found that by locating the incoming conveyors adjacent the ceiling of the bin and allowing the cans to roll uncontrolled off the conveyors into an unoriented pile, and then removing the cans by a conveyor under the floor of the bin and passing them through a can orienting device, such as disclosed in said copending application, it is possible to use two or more conveyors simultaneously in loading the bin and to feed four to six can lines simultaneously when unloading, and the operation only requires one man to supervise the simultaneous loading or unloading of three bins. One problem must be overcome, however, before the unoriented can storage may be of use. It is necessary that the cans be stored in the bin in such manner as to avoid denting the sides of the cans, for such denting will cause jams in later conveying mechanisms, as well as preventing the cans from being filled to their proper capacity. If the cans were merely dumped into the bin from the top, so that they would fall unimpeded to the floor, there would be a great likelihood that the sharp top or bottom edges of the falling cans would strike the relatively bendable side surfaces of the cans already in the bottom of the bin. Accordingly, it is proposed to fill the bin from the bottom upwardly in a novel manner so that the free fall of the cans entering the bin is eliminated, thereby eliminating the danger of the cans being dented.

An important object of this invention is to provide a novel means for placing cans in unoriented storage in a bin by introducing the cans into the bottom of the bin and raising the point of introduction of the cans into the pile of stored cans as the pile increases in height.

A further object of the invention is to provide means for placing cans in unoriented storage in a bin whereby the cans are conveyed into the upper end of the bin and are rolled downwardly to the bottom of the bin to start the pile of stored cans, and whereby the amount of downward rolling of the cans is decreased as the height of the pile increases so that the newly added cans are constantly being rolled onto the upper surface of the pile without dropping onto the pile.

Other objects and advantages of the invention will become apparent in the course of the following detailed description.

One form which the invention may assume is exemplified in the following description and illustrated by way of example in the accompanying drawings, in which—

Fig. 1 is a sectional view taken longitudinally through the center of a storage bin embodying the principles of the invention, the section being taken on line 1—1 of Fig. 2.

Fig. 2 is a plan view of the storage bin shown in Fig. 1.

Fig. 3 is a transverse sectional view taken on line 3—3 of Fig. 1.

Referring now to the drawings, wherein like reference numerals are used to designate like parts throughout the various views shown, there is disclosed an elongated storage bin comprising a floor 10, a rear wall 11, and two side walls 12 and 13. Extending longitudinally of the bin and closely adjacent to the ceiling thereof there is provided a plurality of incoming conveyors 14, two of which are shown, respectively at 14a and 14b. These conveyors are provided with longitudinally adjustable brush-off devices 15 and 16, respectively, said brush-offs being adapted to remove the cans from the conveyor at whatever point the brush-off is located. The conveyors 14a and 14b are provided with terminal brush-offs at 17 and 18, whereby then the adjustable devices 15 and 16 are rendered inactive, the cans will automatically be removed from the conveyor adjacent the rear wall of the bin.

Adjacent the rear wall 11 of the bin there is provided a generally rectangular-shaped chute 19. Such chute is composed of side walls 20 and 21 and a front wall comprising a plurality of horizontal bars 23, each of which is adapted to hingedly support a swinging panel 24. The panels 24 are biased by gravity to close the portions between the horizontal bars 23. Fixed to the rear wall of the bin within the side walls 20 and 21 of the chute there is a plurality of baffles extending diagonally inwardly and downwardly from the rear wall 11, a distance approximately three-quarters of the distance to the front wall of the chute. Similarly, there is provided a series of fixed baffles 25 extending downwardly and rearwardly from each of the bars 23 approximately three-quarters of the way toward the rear of the chute 19. The baffles 25 are staggered with respect to and interposed between the baffles 22, whereby a can dropped into the upper end of the chute is adapted to roll back and forth on the baffles and descend slowly through the chute without a vertical drop of any considerable distance.

Extending longitudinally of the bin and centrally thereof, there is formed in the floor of the bin a vertical U-shaped trough 26. An outgoing conveyor belt 27 is mounted to extend longitudinally within said trough. A motor 28 is provided for driving the belt conveyor 27, said motor 28 being adapted for intermittent operation under the influence of a mechanism to be described later.

As best seen in Fig. 3, there is provided a false flooring 29 which extends diagonally outward and upward from the side edges of the trough 26 in the floor of the bin, whereby the cans resting in a pile in the bin are urged to flow downwardly on said inclined false flooring 29 toward the trough 26 in the central portion of the bin. The trough is adapted to be floored over by means of a plurality of boards 30, which boards may be removed individually to allow the cans on the forward portion of the pile to fall into the trough onto the conveyor belt 27.

The floor of the trough 26 adjacent the terminal or delivery end of the conveyor 27 is further lowered to provide a pit, indicated at 31. There are two diagonal elevating conveyors 32 and 32a, the lower end of each being located in the pit 31. The upper ends of said elevating conveyors are located over the supply end of two can-orienting devices 33 and 33a. Fixedly mounted between the walls of the pit 31 above the lower terminal end of the conveyors 32 and 32a is a fixed baffle member 34 against which the cans are adapted to pile as they drop off the delivery end of the conveyor 27. Pivotally mounted above the pit 31 and spaced from the baffle 34 is a movable baffle 35 adapted to be contacted by the cans piling up against the baffle 34 and moved upwardly thereby. Fixed to the movable baffle 35 is an electrical contact 36 which is adapted to engage a fixed contact 37 when the movable baffle is allowed to fall to its lowermost position. The contacts 36 and 37 are located in the circuit to the motor 28, whereby the cans being conveyor by the conveyor 27 will pile up in the pit against the stationary baffle 34 until the cans reach a level to move the movable baffle 35 and hence the movable contact 36 and open the circuit to the motor 28, stopping the conveyor 27. When the level of the cans in the pit falls sufficiently to allow the movable baffle 35 to descend, the contacts 36 and 37 reengage and the conveyor 27 resumes operation. After the cans have passed through the orienting devices 33 and 33a, they are picked up by can elevators 38 and 38a and delivered to the outgoing conveyors 39 and 39a.

The operation is as follows: The cans being put into the storage bin come in on the can line conveyors 14 and are brushed off the terminal end thereof into the chute 19, where they descend gradually by means of the baffle members 22 and 25 and issue through the open space below the lowermost bar 23 on the forward face of the chute 19 and spill out on the removable floor boards 30 in random orientation. During their descent the cans are prevented from exiting from the chute through the swinging panels 24 since the weight of the panels maintains them in a closed position and the force of the freely rolling cans against the panels is insufficient to overcome the closing bias on the panels. As the level of the cans builds up above the lowermost bar 23, the cans will no longer be free to exit from the chute 19 through the open space below the lowermost bar 23 and the incoming cans will build up in the chute to exert a force on the lowermost swinging panel 24, causing it to swing outwardly so that the cans may issue from this now open panel. Again the cans will roll onto the pile until the cans assume a level indicated by the dot-dash line 40, at which time the cans will again build up in the chute to cause the next higher swinging panel 24 to open. The cans will now roll out on the upper surface of the pile and build up to the dot-dash line indicated at 41. In rolling down the chute 19 the cans will remain in an oriented manner with the axes of the cans being parallel. Thus, the force of the cans against one another necessary to open the lowermost swinging panel 24 will be transmitted through the relatively stiff ends of the cans, and there will be no tendency to dent the cans. The cans progressively will open the swinging panels 24 until the uppermost panel is open and then the cans will spill over the top of chute 19 and assume a level indicated by the dot-dash line 45. As will be apparent, each time the cans build up in the chute 19 the greatest force will be exerted on the lowest closed swinging panel. Thus, even through the panels 24 are identical, the cans will build from the bottom up and a force sufficient to open the lowermost closed swinging panel will be applied to open that panel before a similar force is built up against any of the higher panels 24. Therefore, the panels 24 will open automatically and progressively from the bottom up, to prevent any premature opening of the upper swinging panels 24 and thus will prevent any cans from free falling through a considerable height onto the pile surface. After the pile of cans in the rear of the bin has been built up to the level indicated by the dot-dash line 45, the adjustable brush-off members 15 and 16 are then activated to brush the cans off the conveyors 14 at a point where they will fall on the forward face of the pile of cans. Brush-off members 15 and 16 are then progressively moved toward the front of the bin and progressively build the pile toward the front of the bin.

It is thus seen that the pile has been built up to fill the bin without any of the cans falling freely through any substantial distance, and the problem of undesirable denting of the cans during the storage process is eliminated.

When it is desired to remove cans from the bin, the floor boards 30 are progressively removed from beneath the front face of the pile, allowing the cans to fall down onto the conveyor belt 27 in the trough 26 and be conveyed thereon to the pit 31. As previously explained, the intermittent operation of this conveyor belt 27 under the control of the movable baffle member 35 thus insures the correct supply of cans in the pit 31, but prevents the overloading of the elevating conveyors 32 and 32a. The conveyors 32 and 32a carry the cans upwardly and deposit them at the supply end of the can-orienting devices 33 and 33a. The cans issue from the orienting devices 33 and 33a in an oriented condition, i. e., all having their open ends facing in the same direction, and are picked up by the elevators 38 and delivered to the outgoing conveyors 39 and 39a. It is to be understood that more than two outlet conveyors may be provided, two being shown herein by way of example only.

From the foregoing description it may be seen that I have provided an apparatus and method of storing cans wherein the cans are delivered to the bin and automatically stored therein without relation to their orientation, thus eliminating the manual handling thereof, and without danger of denting the cans during the storage operation. Further, the cans may be removed from the bin automatically, passed through an orienting device whereby the cans are again all facing in the same direction, and placed on the can line conveyors leading to the cannery without manual handling.

While I have shown and described the preferred form of my invention, it is to be understood that various changes may be made in its construction by those skilled in the art without departing from the spirit of the invention as defined in the appended claims.

Having thus described my invention, what I claim and desire to secure by Letters Patent is:

1. Apparatus for storing cans comprising a storage bin, means adjacent the ceiling of said bin for conveying cans into said bin, a chute extending substantially vertically from the floor of said bin upwardly to said conveying means to receive cans therefrom, said chute having a front wall and an opposed rear wall, said front wall having a plurality of baffles extending diagonally downwardly and rearwardly, said back wall having a plurality of baffles extending diagonally downwardly and frontwardly, said front wall baffles being staggered with respect to and interposed between said rear wall baffles, whereby a can dropped into the upper end of said chute will pass back and forth on said baffles which descend therethrough, said front wall being comprised of a plurality of vertically spaced superposed normally closed hinged panels, said panels when in a closed position preventing cans from issuing from said chute at the level of said panels, and said panels being adapted to automatically swing open progressively from bottom to top as the level of stored cans rises in said storage bin to permit the cans to roll from said chute at progressively higher levels therefrom onto the upper surface of said stored cans.

2. Apparatus for storing cans comprising a storage bin, means adjacent the ceiling of said bin and extending longitudinally thereof for conveying cans into said bin, a chute extending substantially vertically from the floor of said bin upwardly to said conveying means to receive cans therefrom, said chute having a front wall and an opposed rear wall, said front wall having a plurality of baffles extending diagonally downwardly and rearwardly, said back wall having a plurality of baffles extending diagonally downwardly and frontwardly, said front wall baffles being staggered with respect to and interposed between said rear wall baffles, whereby a can dropped into the upper end of said chute will pass back and forth on said baffles which descend therethrough, said front wall being comprised of a plurality of vertically spaced superposed normally closed hinged panels, said panels when in a closed position preventing cans from issuing from said chute at the level of said panels, said panels being adapted to automatically swing open progressively from bottom to top as the level of stored cans rises in said storage bin to permit the cans to roll from said chute at progressively higher levels therefrom onto the upper surface of said stored cans, and means operatively associated with said conveying means for brushing cans from said conveyor onto the forward face of said stored cans.

3. In an apparatus as set forth in claim 2 wherein said brushing means is adjustable longitudinally of said conveying means.

4. Apparatus for storing cans comprising a storage bin, means adjacent the ceiling of said bin for conveying cans into said bin, a chute extending substantially vertically from the floor of said bin upwardly to said conveying means to receive cans therefrom, said chute having a front wall and an opposed rear wall, said front wall having a plurality of baffles extending diagonally downwardly and rearwardly, said back wall having a plurality of baffles extending diagonally downwardly and frontwardly, said front wall baffles being staggered with respect to and interposed between said rear wall baffles, whereby a can dropped into the upper end of said chute will pass back and forth on said baffles which descend therethrough, said front wall being comprised of a plurality of vertically spaced superposed normally closed hinged panels, said panels when in a closed position preventing cans from issuing from said chute at the level of said panels, said panels being adapted to automatically swing open progressively from bottom to top as the level of stored cans rises in said storage bin to permit the cans to roll from said chute at progressively higher levels therefrom onto the upper surface of said stored cans, removable sections in the floor of said bin, and a conveyor beneath said removable sections extending longitudinally of said bin for removing said stored cans from said bin.

References Cited in the file of this patent

UNITED STATES PATENTS

| Number | Name | Date |
|---|---|---|
| 230,144 | Merry | July 20, 1880 |
| 778,301 | Burdick | Dec. 27, 1904 |
| 803,944 | Wallace et al. | Nov. 7, 1905 |
| 1,121,328 | Curtis | Dec. 15, 1914 |
| 1,234,710 | Adams | July 31, 1917 |
| 1,430,183 | Petersen | Sept. 26, 1922 |
| 2,134,948 | Lienau et al. | Nov. 1, 1938 |
| 2,304,455 | Guerard | Dec. 8, 1942 |
| 2,503,210 | O'Halloran | Apr. 4, 1950 |

FOREIGN PATENTS

| Number | Country | Date |
|---|---|---|
| 322,577 | Great Britain | Dec. 12, 1929 |